April 23, 1929. L. G. COPEMAN Re. 17,279

SHARP FREEZING CONTAINER FOR MECHANICAL REFRIGERATORS

Original Filed May 3, 1928 2 Sheets-Sheet 1

INVENTOR.
LLOYD G. COPEMAN
BY Stuart C. Barnes
ATTORNEY.

April 23, 1929. L. G. COPEMAN Re. 17,279
SHARP FREEZING CONTAINER FOR MECHANICAL REFRIGERATORS
Original Filed May 3, 1928 2 Sheets-Sheet 2
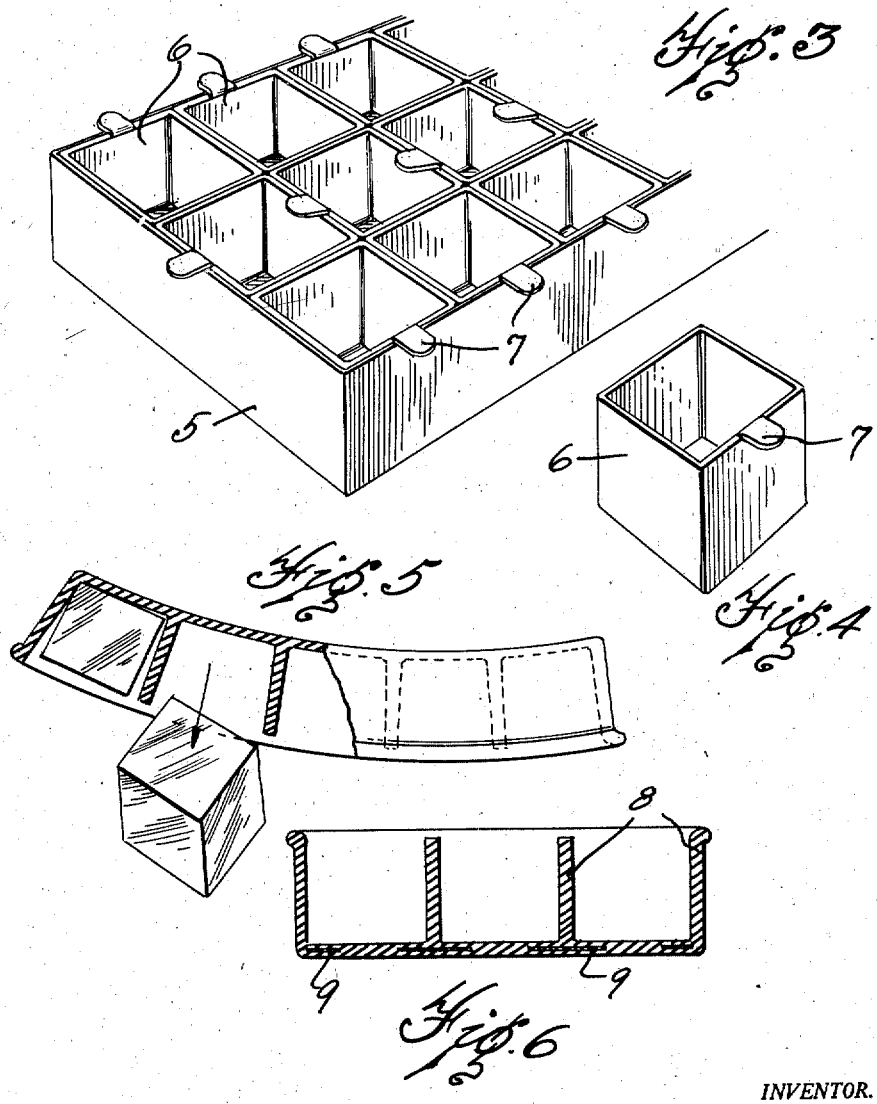
INVENTOR.
LLOYD G. COPEMAN
BY Stuart B. Barnes
ATTORNEY.

Reissued Apr. 23, 1929.

Re. 17,279

UNITED STATES PATENT OFFICE.

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN.

SHARP FREEZING CONTAINER FOR MECHANICAL REFRIGERATORS.

Original No. 1,675,599, dated July 3, 1928, Serial No. 274,717, filed May 3, 1928. Divided and this application for reissue filed January 4, 1929. Serial No. 330,360.

DIVISION B

This invention relates to sharp freezing containers for mechanical refrigerators, and has to do particularly with a novel structure for forming ice cubes and the like, and the method of separating and releasing the ice cubes when desired.

Practically every domestic refrigerator embodying automatic refrigeration is provided with a low side or cooling unit having sharp freezing chambers for the reception of one or more trays, commonly called ice cube trays. Any one who has used these ice trays has experienced the difficulty of removing the ice cubes from the tray, it usually being necessary to either hold the tray up side down under running warm water to release the entire batch of ice cubes and then remove them one by one from the frame, or to direct the hot water at one particular point on the top or bottom of the tray to only release a few of the ice cubes at one time. This operation is not only tedious and messy but results in a material melting away of the ice cubes obtained and also results in material melting of the other ice cubes left in the tray and replaced in the refrigerator. Furthermore, the door of the refrigerator is frequently left open during this procedure and the length of time hitherto required to separate and obtain one or more ice cubes has resulted in a material warming of the refrigerator interior and a consequent reduction in efficiency.

It is the object of the present invention to provide sharp freezing trays for the freezing of ice cubes and the like, which are of such composition and such flexibility as to permit distortion thereof and quick removal of one or more ice cubes without any heating or melting of the tray, the only step required being the distortion of all or a portion of the tray.

This novel sharp freezing container is preferably obtained by forming the tray or a portion thereof out of a flexible material such as rubber, preferably molded. Each ice cube is therefore formed within flexible or distortable walls the distortion of which permits easy separation and/or removal of the ice cubes. This will be true regardless of whether each ice cube is formed in an individual container of flexible material or the complete tray is made up of flexible material.

This application is a division of my reissue application filed of even date herewith.

Figure 1:
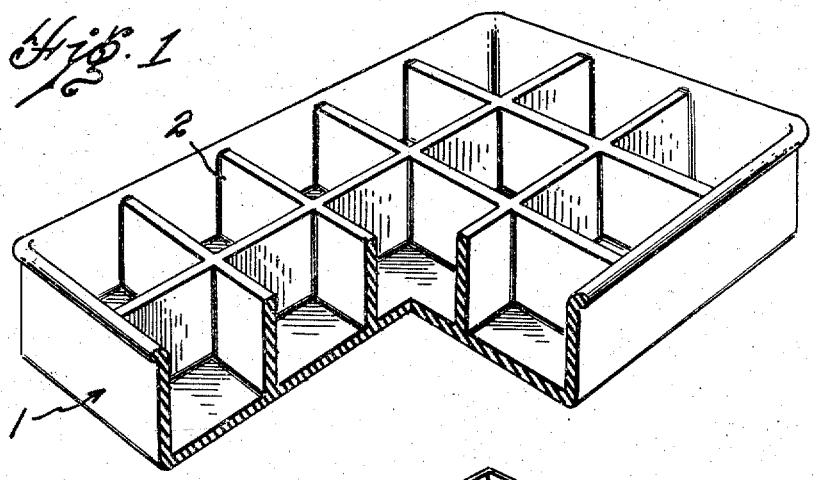
Fig. 1 is a perspective view, partly cut away, of an ice cube tray embodying my invention.
Figure 2:
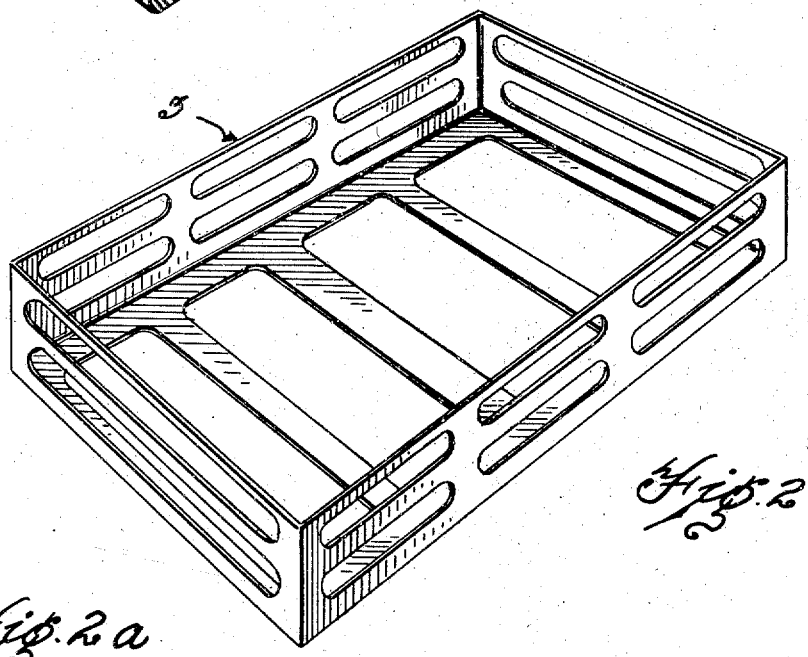
Fig. 2 is a perspective view of a reinforcing tray or frame such as might be utilized for reinforcing the ice cube tray shown in Fig. 1.
Figure 2A:
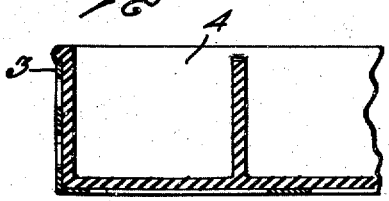

Fig. 2ª is a fragmentary sectional view of a flexible ice cube tray similar to that shown in Fig. 1, as assembled in a reinforcing frame such as shown in Fig. 2.

Fig. 3 is a fragmentary perspective view of a sharp freezing container for individual ice cube cups.

Fig. 4 is a perspective view of one of the cups as shown in Fig. 3.

Fig. 5 is a diagrammatic view illustrating the manner of separating and removing ice cubes from a container such as shown in Fig. 1.

Fig. 6 is a cross sectional view of an ice cube container similar to that shown in Fig. 1, but being provided with a reinforcing plate in the bottom thereof.

The gist of the present invention relates to the forming of a sharp freezing container, such as ice cube trays, out of a flexible material, and while I have shown a preferred form and several modifications, it will be obvious that these may be varied to a considerable extent without departing from the basic idea embodied therein.

In Fig. 1 I have shown an integral ice cube tray which may be generally designated 1. The tray is preferably formed of molded rubber of a consistency which will withstand the freezing action of the ice cubes. In the embodiment shown in Fig. 1, while the tray is formed integrally and is thus flexible it is also so formed as to be inherently reinforced in order to stand up when filled with water and inserted in the cooling unit of the refrigerating system. Suitable partitions 2 are formed integrally with the sides of the container and are of course likewise formed of rubber. Such partitions may vary considerably as to thickness and height.

In Fig. 2 I have shown what may be termed an addition to the structure shown in

Fig. 1, or a modification thereof. The frame shown in Fig. 2 may be generally designated 3 and is preferably perforated, as shown, whereby to provide just enough stiffness to hold the rubber tray in place. It will be obvious that if such a frame, as shown in Fig. 1, is utilized the rubber container tray may be much thinner and even of much greater resiliency. Such a frame and tray is shown as at 4 in Fig. 2[a].

When such a frame as 3 is utilized as a reinforcing medium, it will be obvious that the rubber tray can either be completely removed or the frame itself may be of such flexible material as to be distortable with the rubber container. The openings in the bottom of the frame may also be readily utilized in flexing the rubber container to separate and discharge the ice cubes.

A further modification of the present invention is shown in Fig. 3 wherein a standard tray 5 may be utilized to receive a plurality of individual containers 6. These containers 6 are preferably formed of molded rubber, and each is preferably provided with a suitable tab 7 to permit ready removal thereof from the tray. It will be obvious that a frame such as shown in Fig. 2, or a flat frame having apertures, may also be used for receiving and positioning the individual cup 6. When individual containers such as 6 are utilized it will be obvious that they may be made of very flexible material and independently removed from the tray. Not only may the walls of such container 6 be flexed to discharge the ice cubes but I have found that the entire container may be turned inside out to quickly and positively discharge the ice cubes.

Very frequently it is desirable to obtain only one or two ice cubes at a time and by utilizing such single containers it is possible to very quickly remove the single container from its tray or frame and discharge the ice cubes therefrom. Such ice cubes will be in their whole, normal and comparatively dry condition.

In Fig. 6 I have shown a further modification of my structure wherein the upper walls 8 are formed of molded rubber and the bottom wall reinforced by a suitable plate 9 which is preferably perforated. This bottom plate 9 will give the entire tray necessary rigidity so that it can be moved in and out of the cooling unit and the upstanding walls 8 will be of suitable rigidity to hold the water but still being flexible enough to permit easy discharge of the ice cubes.

In Fig. 5 I have illustrated one manner of carrying out the novel method involved in the structure as shown in Fig. 1 or even in Fig. 2. In the diagrammatic view illustrated, the flexible tray is shown as being flexed so as to distort the walls thereof and free the ice cubes.

It will thus be seen that I have provided a novel sharp freezing container for ice cubes and the like, which is formed of a material having relatively small affinity for the ice and not readily wettable by water but also being flexible in varying degrees so as to permit easy discharge of the ice cubes therefrom. It will be understood that the flexibility and even the flexible material itself may vary within wide limits according to the nature of the frozen article or articles and the size and shape thereof, it being obvious that in some instances it may be desirable to have an entire tray formed of rubber without the inner connecting partitions so that a single large hunk of ice or other frozen substance may be quickly removed therefrom by merely distorting or flexing the material of the container.

What I claim is:

1. A container for use with mechanical refrigerating units and adapted to receive water or the like to be frozen, comprising compartments formed at least in part of a flexible and elastic material, and reinforcing means for maintaining the container in operative shape without destroying the flexibility of some of the walls thereof.

2. A container of the type adapted to be inserted in heat conducting relation with the cooling unit of a mechanical refrigerating system for freezing water and the like, comprising compartments formed of a permanent readily distortable material not readily wettable by water to permit easy removal of the frozen article or articles, and reinforcing means for reinforcing at least a part of the distortable container and maintaining the container in operative shape when filled with water and the like.

3. A container of the type adapted to be inserted in heat conducting relation with the cooling unit of a mechanical refrigerating system for freezing water and the like, comprising a molded main container formed at least in part of rubber and distortable to permit easy removal of the frozen article or articles, and reinforcing means for giving the main container sufficient rigidity so that it can be moved into and out of the cooling unit as a unit.

4. A container of the type adapted to be inserted in heat conducting relation with the cooling unit of a mechanical refrigerating system for freezing water and the like, comprising a series of compartments formed of an inherently flexible material not readily wettable by water, said flexible material forming the compartments being relatively thin, and means for reinforcing and maintaining the container in operative shape so as to hold water and the like.

5. A sharp freezing container of the type adapted to be positioned in heat conducting relation with the cooling unit of a mechanical refrigerating system, comprising a main container having walls for defining the shape and size of the article or articles to be frozen, said walls being inherently self-supporting and formed at least in part of a non-metallic inherently flexible material to which ice does not readily adhere, and reinforcing means positioned adjacent the bottom portion of said container to give the container sufficient rigidity so that it can hold water and the like and be moved in and out of the cooling unit as a compact unit.

6. A sharp freezing container of the type adapted to be positioned in heat conducting relation with the cooling unit of a mechanical refrigerating system, comprising a container formed of walls for defining the shape and size of the article or articles to be frozen, said walls being formed at least in part of rubber and being self-supporting, and reinforcing means positioned adjacent the bottom and at least a portion of the sides of the container for maintaining the container in operative shape without destroying the non-adhering properties in some of the walls thereof.

7. A sharp freezing container for use in connection with mechanical refrigerating units, comprising a main container member and a plurality of individual containers independently positioned therein, said individual containers being made of elastic material to permit easy removal of the frozen article or articles therefrom.

8. A sharp freezing container for use in connection with mechanical refrigerating units, comprising a main container and a plurality of individual containers positioned within said main container and formed of a permanent composition to which ice does not readily adhere whereby to permit easy removal of the frozen article or articles.

In testimony whereof I affix my signature.

LLOYD G. COPEMAN.